United States Patent
Caracappa

[15] 3,658,036
[45] Apr. 25, 1972

[54] AUTOMATIC TIME-CONTROLLED FEEDING APPARATUS FOR ANIMALS

[72] Inventor: Michael Caracappa, 529 Ruby St., Brooklyn, N.Y. 11208

[22] Filed: Mar. 18, 1970

[21] Appl. No.: 20,666

[52] U.S. Cl. ............................................. 119/51.13, 119/56
[51] Int. Cl. .......................................................... A01k 5/02
[58] Field of Search ........................ 119/51.13, 51.11, 3, 56

[56] References Cited

UNITED STATES PATENTS

| | | | |
|---|---|---|---|
| 2,500,243 | 3/1950 | Dixon | 119/51.13 |
| 3,340,851 | 9/1967 | Frank et al. | 119/51.13 |
| 2,189,213 | 2/1940 | MacDonell | 119/51.13 |
| 1,424,079 | 7/1922 | Canell | 119/51.13 |
| 3,050,029 | 8/1962 | Appleton | 119/51.13 |
| 3,416,497 | 12/1968 | Riel | 119/51.11 |

FOREIGN PATENTS OR APPLICATIONS 183,594  10/1955  Austria ............................. 119/51.13

Primary Examiner—Aldrich F. Medbery
Attorney—Julius E. Foster

[57] ABSTRACT

An automatic clock-controlled feeder for releasing food progressively from food compartments to a dish available to an animal to be fed.

6 Claims, 5 Drawing Figures

PATENTED APR 25 1972

INVENTOR.
Michael Caracappa

BY
ATTORNEY

AUTOMATIC TIME-CONTROLLED FEEDING APPARATUS FOR ANIMALS

This invention relates to an automatic time control feeding apparatus for animals.

It is desirable to provide an animal feeder that may be programmed and controlled to periodically release a stored quantity of food from a multicompartment storage device to a suitable feeding bowl that is available and accessible to the animal.

One object of this invention is to provide an automatic program apparatus for delivering a pre-determined quantity of food from pre-determined storage compartments to a vessel accessible to the animal to be fed.

Another object of the invention is to provide such a feeding apparatus having several compartments, from each of which food may be delivered to a feeding bowl for the animal, at pre-determined times and at pre-determined intervals.

Another object of the invention is to provide in such an apparatus a time control which may be adjustably set to determine, for example, the times of day when food would be released to a feeding bowl for the animal, and also to control the time interval between such feedings.

In accordance with the invention an animal food container or canister is constructed to embody several radial compartments arranged in a circle in a horizontal plane around a central vertical axis, with the compartments symmetrically arranged.

Each compartment is provided with a hinged bottom trapdoor which is normally held closed by a disk provided with a suitable slot and rotated to progressively release the trapdoors of the successive and sequential compartments to release the food in each compartment so the food may drop down into a suitable dish accessible to the animal that is to be fed.

The releasing disk is rotated by a motor-driven timing device, which is essentially a motor-driven clock, to rotate the disk progressively to the appropriate positions to release the trapdoors sequentially to empty the food compartments.

The canister with the several food compartments is arranged to be supported in elevated position on top of a post which is constructed to permit the bottom end of the post to be suitably anchored, for example, with a sharpened end stuck into the ground, or with the bottom end held by a weighted stable base. The eating dish into which the food from any emptied compartment is directed for access by the animal to be fed, is preferably shaped and disposed to symmetrically surround the bottom end of the post. A suitably shaped apron or food guide of relatively strong fabric material is suspended from a circular rim around the food canister, and that apron serves to guide any released food from any compartment into the eating dish.

The construction of the apparatus, and the manner in which it functions, are illustrated in greater detail in the following specification and description, taken together with the drawings, which illustrate one preferred form of construction, and in which:

FIG. 1 is a side view of the food dispenser of this invention, with a food guide supported from the canister and a portion broken away to show a support coupling for anchoring and attaching the canister to the top of a support post for the entire assembly;

FIG. 2 is a plan view of the canister, showing several food-receiving compartments, with their related trapdoors shown in position assembled on the canister and below each of the food compartments, with a central co-axial and concentric space indicated for accommodating a motor-driven timing mechanism and an associated rotatably driven control disk for holding the trapdoors in closed position until each one is to be released in progressive order;

Figure 1:
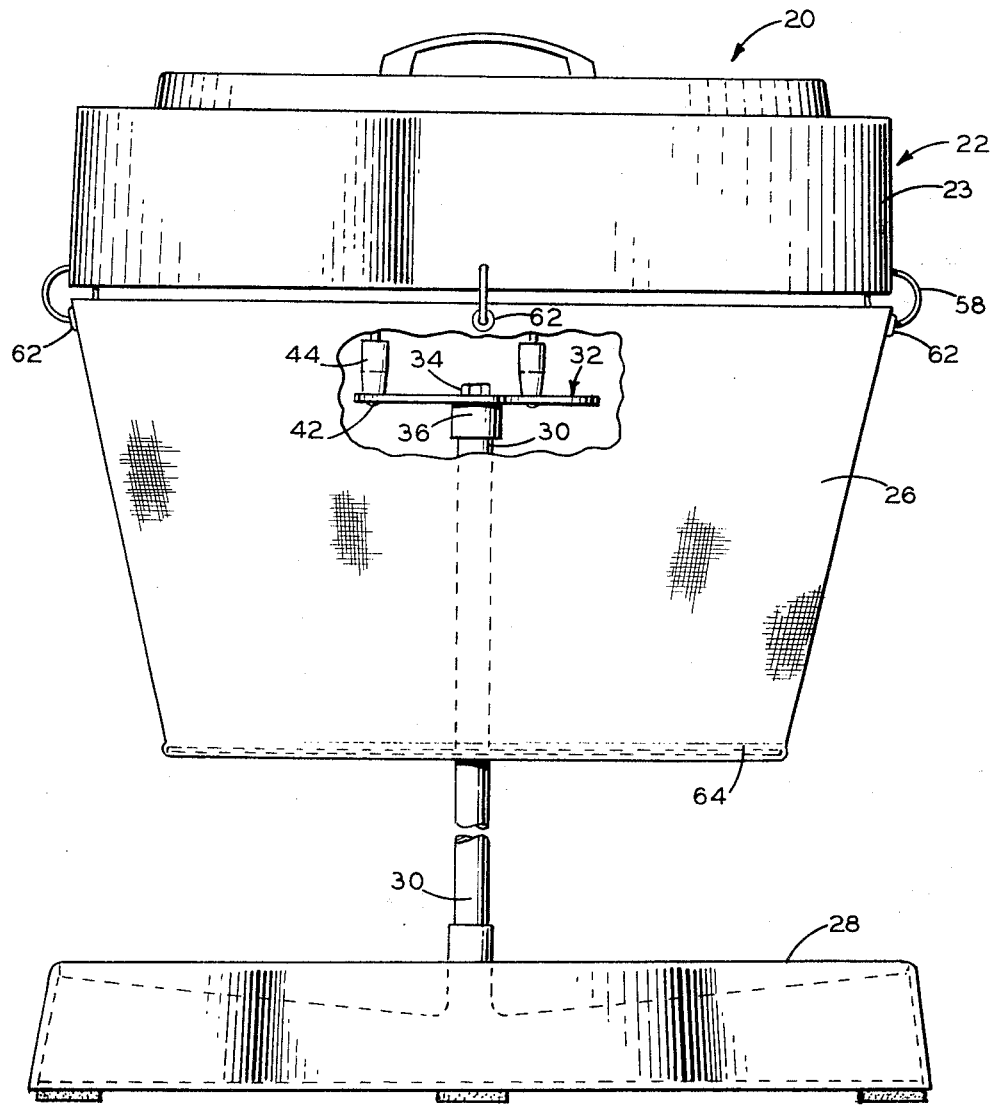
Figure 4:
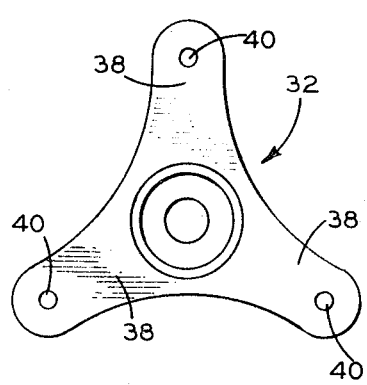
FIG. 4 is a plan view of a yoke by means of which the canister is supported with the yoke assembled onto the top of the support post, shown in more detail in FIG. 3.
Figure 5:
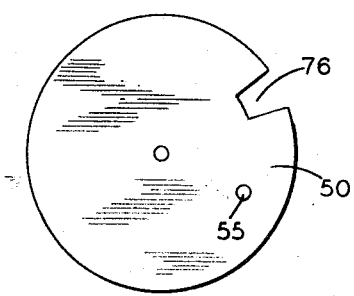
FIG. 5 is a plan view of the disk which is shown in its relationship to the trapdoors of the food compartments.
Figure 2:
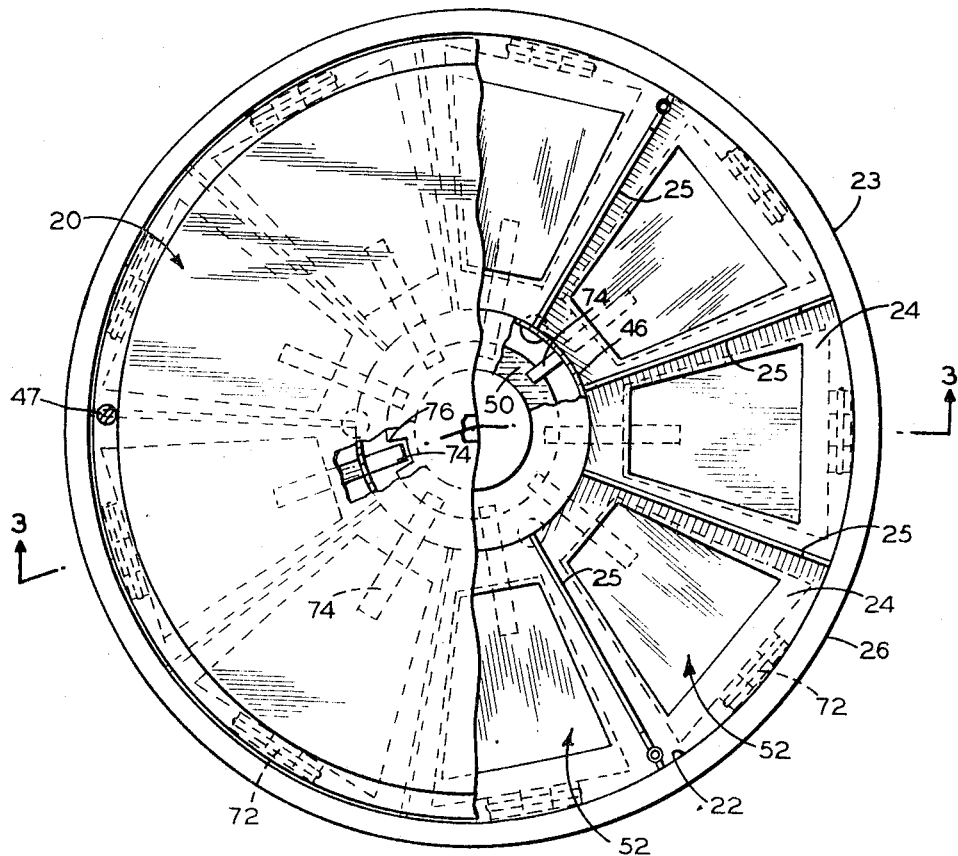

As shown in FIG. 1, an automatic time control feeding apparatus 20 for animals, is shown comprising a canister or container 22 for containing food in various bins or compartments 24, and a guide apron 26 suspended from the canister 22 for guiding food released from the compartments, shown in detail in FIG. 2, so the food will move down into a dish 28 that is accessible to the animal that is to be fed.

As further shown in FIG. 1, the horizontal canister 22 is supported atop a centrally co-axial post 30, whose bottom end is suitably anchored as will be explained below. The apparatus further comprises a coupling support between the compartmentalized canister 22 and the post 30, through a yoke 32 that is centrally and co-axially supported on top of the post 30 by a suitable nut and sleeve combination 34, 36. The yoke 32 is provided with three arms 38 with a hole 40 adjacent the end of each yoke arm 38 to receive a screw 42 for anchoring a yoke mount 44 on the yoke with the upper end of the yoke mount 44 disposed to support a cylindrical collar 46 which serves as a support and enclosure for a motor-operated timing mechanism 48 which controls the timing for discharging the food from the food compartments 24 by progressively releasing the hinged bottom trapdoors 52 from closed position for the respective compartments and permitting those trapdoors to open. In order to guide the food from each of the compartments upon the release and opening of the hinged doors 52, the guide apron 26, of truncated conical shape, is supported from a ring 23 surrounding the canister 22 along the lower edge border of the outer ring 23 by wire hooks 58 insertable into and removable from the holes in the outer ring 23 and similarly insertable into and removable from cooperating holes 62 along the upper border edge of the guide curtain. The bottom opening 64 in the guide apron 26 is of appropriate dimension in respect to the dish 28 to assure that the food dropped from any one of the compartments 24 when its trapdoor 52 is opened will fall into the eating dish 28 for the animal to be fed as shown in FIG. 1.

Figure 3:
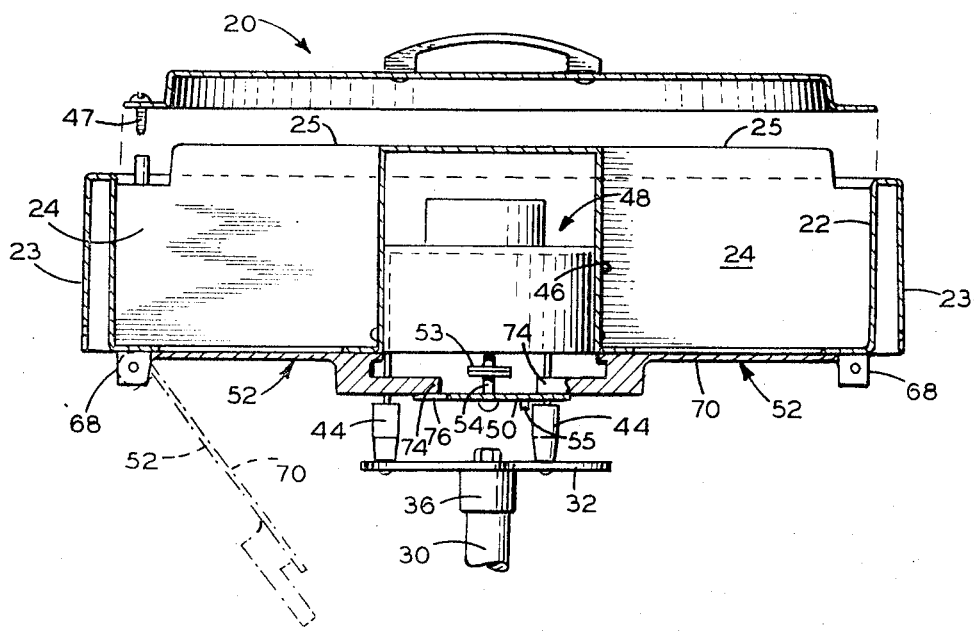
FIG. 3 is a vertical sectional view of the compartmented canister shown in FIG. 2, and shows two compartments and the region for accommodating the motor-driven clock mechanism, as well as a ring encircling the canister to serve as a peripheral support for the food guide apron shown in FIG. 1.

As shown in FIG. 3, the cylindrical ring 23 surrounds the canister 22. It is supported on the canister 22 to serve as a support for the guide apron 26. The canister 22 may be made of plastic material or metal. Plastic material is preferred since the entire canister may be made in one piece that can be easily rinsed and cleaned. The guide apron 26 is preferably of fabric, which can be folded when it is to be transported.

As shown in FIG. 2, the circular rim or border edge of the plastic canister around its bottom edge is originally shaped, or later provided with hinge elements 68 along the radial median line of each compartment 24 to receive a cooperating hinge element on the trapdoor or closure 52 at the bottom of the compartment.

As further shown in FIG. 2 each trapdoor 52 embodies a main central body 70, slightly larger than the area of the compartment with which it is associated, and a cooperating hinge element 72, and a holding finger 74 by means of which the doors 52 are held closed by the underlying time-controlled disc 50 until the disc 50 is rotated to a position where its radial slot 76 is under a holding finger 74 and in position to release the finger 74 downward and permit the door 52 to drop to release the food from the corresponding compartment. The compartments are separated by partitions which define the area, and the necessary size of the trapdoors 52.

As previously shown in FIG. 1, the guide apron 26 is downwardly tapered and truncated. That guide apron 26 may be made of any suitable fabric material such as heavy burlap or canvas, with a wire ring at the bottom opening to hold the fabric open and to provide a certain amount of weight to hold the guide apron open and hanging symmetrically. The holes 62 at the top of the guide apron may be suitably provided by the use of metal eyelets.

The timing mechanism may be adjustably controlled and the timing set to release the trapdoors of successive compartments at selected time intervals. The housing of the timing mechanism may be secured to the canister for mutual support by any suitable means, shown here, by way of example, as screws 47.

In order to permit the disc 50 to be adjustably positioned on the clock shaft 54, a suitable clutch is provided as schematically indicated by box 53. A button 55 on disc 50 permits angular adjustment of the disc 50 to a position desired.

As shown, the eating dish may be formed as part of the base that stabilizes the apparatus. The disc base may be a hollow plastic or metal casting that may be filled with sand to provide extra weight and stability.

Obviously the number of compartments may be varied as desired, in manufacture, with each compartment providing enough compartment space to accommodate food for one day's feeding. The type of food contemplated for use therein would be preferably dry type meat foods.

The invention is not limited to the structural details that are illustrated since they may be modified within the spirit and scope of the invention as defined in the claims.

What is claimed is:

1. An automatic clock controlled animal feeder and dispenser, comprising
   a stationary circular container symmetrical about a vertical axis and constructed to embody and define a plurality of radial compartments, each for receiving a predetermined quantity of food for an animal to be fed, and each compartment having a bottom flap or trap-door to permit the food to drop from the compartment;
   a post for supporting the circular container at an elevated level above ground;
   means on top of the post for supporting said food container;
   a dish disposed adjacent the bottom of said post, and available and open around its entire periphery to an animal to be fed;
   a movable time-controlled release means for opening each of said trap-doors in sequence to permit the food in each compartment to fall through the related trap-door space;
   and means supported on said circular container for guiding any falling food from said container into said dish.

2. A feeder and dispenser, as in claim 1, in which
   said time-controlled means serves to hold all said trap-doors closed until a predetermined time at which one compartment trap-door is permitted to open to release the contents of said compartment, with the doors supported to be freely movable in their own paths free of blockage by adjoining doors.

3. A feeder and dispenser, as in claim 2, in which
   said time-controlled means may be set to open a predetermined number of compartments in sequence at predetermined time intervals.

4. A feeder and dispenser, as in claim 1, in which
   said time-controlled means includes a notched disc for selectively releasing each trap-door when the disc is rotated to align the notch with each trap-door to be permitted to open, with each trap-door being supported so upon release it will be free to move to its full open position without interference by other doors.

5. An animal feeder and dispenser, as in claim 1, in which
   said means on top of the post for supporting said food container consists of a plate with a plurality of radial arms and an anchoring element to secure the plate to the top of said post;
   and means for releasably securing said circular container to said arms of said supporting means.

6. An animal feeder and dispenser as in claim 4, in which
   said time-controlled means is disposed and supported centrally and co-axially on said circular container, and includes a shaft disposed and supported co-axially from said time-controlled means and said notched disc is secured to and supported on said shaft to be rotated by said shaft in a plane immediately beneath said trapdoors to hold all said trapdoors closed until said predetermined time when said disc releases a trapdoor, with the trapdoors hinged from their outer peripheries, to permit free movement of each door upon opening, without interference from a previously opened door, and without interference to a subsequently opened door.

* * * * *